United States Patent
Hata (10) Patent No.: US 7,483,784 B2
(45) Date of Patent: Jan. 27, 2009

(54) ENGINE STARTING SYSTEM

(75) Inventor: Toshiaki Hata, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 0 days.

(21) Appl. No.: 11/943,024

(22) Filed: Nov. 20, 2007

(65) Prior Publication Data

US 2008/0281505 A1 Nov. 13, 2008

(30) Foreign Application Priority Data

May 10, 2007 (JP) ............................. 2007-125528

(51) Int. Cl.
*G06F 19/00* (2006.01)
*F02N 17/00* (2006.01)
(52) U.S. Cl. .................. 701/113; 123/179.2; 307/10.6; 340/426.11
(58) Field of Classification Search ................ 701/113, 701/114, 115; 123/179.1, 179.2; 307/10.1, 307/10.2, 10.3, 10.6, 10.7; 340/426.11, 426.17, 340/426.36

See application file for complete search history.

(56) References Cited

U.S. PATENT DOCUMENTS 7,423,353 B2 * 9/2008 Hata ......................... 307/10.3

2004/0090195 A1 * 5/2004 Motsenbocker ............. 318/109
2006/0106525 A1 * 5/2006 Hata ........................... 701/113
2007/0164610 A1 * 7/2007 Hata ........................... 307/10.2
2008/0136611 A1 * 6/2008 Benco et al. ............. 340/426.3

FOREIGN PATENT DOCUMENTS

JP 2006-137338 A 6/2006

* cited by examiner

*Primary Examiner*—John T Kwon
(74) *Attorney, Agent, or Firm*—Sughrue Mion, PLLC (57) ABSTRACT

Provided is an engine starting system which is highly reliable in that a battery does not run out even if a manual switch is tampered and operated many times by a third party. Equipment on the propelled object side (2) includes an actuation signal refusing unit (22a) which avoids responding to an actuation signal from a switch (31) for a third predetermined time in at least one of the states where a number of actuation signals successively transmitted from the switch without producing an answer signal thereto has become equal to or larger than a prescribed number of times predetermined in a first predetermined time period and where the actuation signal has been kept tuned ON for a period equal to or longer than a second predetermined time period without producing an answer signal thereto.

13 Claims, 10 Drawing Sheets

ENGINE STARTING SYSTEM

BACKGROUND OF THE INVENTION

1. Field of the Invention

The present invention relates to an engine starting system applied to a propelled object including a vehicle which is propelled by an engine (internal combustion engine) mounted thereon (for example, a two-wheeled vehicle, a four-wheeled vehicle, an all terrain vehicle (ATV), a ship, a jet-propulsion watercraft, or the like), and more particularly to a technique of preventing a battery from running out (a battery voltage from dropping) due to tampering of a switch by a third party, the switch being manually actuated for starting the engine.

2. Description of the Related Art

Conventionally, a vehicle using a portable electronic key (portable equipment) is provided with a starting switch which is manually actuated. For example, in a case of a four-wheeled vehicle, the switch is provided to a door handle or a trunk lid of the vehicle. When the switch is actuated by a driver, the switch communicates with the electric key so as to obtain an ID number from the electric key. The ID number is collated with an ID number registered in a control device (equipment on the propelled object side) installed on the vehicle side, and when the ID numbers coincide with each other, the door lock is released.

Also, in a case of a two-wheeled vehicle, there has been proposed a system capable of reliably protecting the vehicle against theft based on a system similar to that for a four-wheeled vehicle.

For example, there has been disclosed an engine starting system for regularly starting an engine mounted on a propelled object, which includes: equipment on a propelled object; a switch; portable equipment; steering unlocking section; power activating section; and an engine control unit, the equipment on a propelled object transmitting, in response to an actuation signal from the switch, an inquiry signal including a collation code to the portable equipment, the portable equipment transmitting an answer signal including a cipher code corresponding to the inquiry signal, the equipment on the propelled object side allowing the engine to start by causing the engine control unit to operate, in a case where the answer signal corresponds to the inquiry signal, by unlocking the steering unlocking section and activating the power activating section, in which the equipment on the propelled object side executes an unlocking operation of the steering unlocking section, an operation to turn ON the power activating section, or a cranking operation by the engine control unit (refer to, for example, JP 2006-137338 A).

When the conventional engine starting system is applied to a two-wheeled vehicle, it is necessary to take countermeasures against tampering more adequately than in the case of a four-wheeled vehicle. In particular, in a case of a conventional mechanical key cylinder, there has been adopted a mechanism capable of preventing the lock from being forced open with a screw driver or preventing a key inserting hole from being stuffed with a foreign object or being operated. Even in a case of an electronic key, operating an activation switch provided outside of a vehicle leads to start collating IDs with portable equipment, and therefore it is presumed that the switch is repeatedly pushed by a third party. When the switch is actuated by being pushed by a third party, equipment on a propelled object side is activated and transmits radio waves in order to communicate with the portable equipment side. Accordingly, the equipment transmits radio waves every time the switch is actuated even if the portable equipment of the vehicle does not exist, and therefore the battery is consumed and several amperes of current flows therethrough. Therefore, if the switch is tampered and actuated too many times, it may leads to a problem that the battery is made impossible to start the engine due to a power supply voltage drop, that is, the battery runs out.

There has also been a problem that a radio wave transmission portion becomes overheated due to the repetitive actuation of the switch, which leads to a deterioration of a circuit and a failure of the engine starting system.

SUMMARY OF THE INVENTION

The present invention has been made in view of the above-mentioned problems, and it is an object of the invention to provide an engine starting system which is highly reliable in that a battery does not run out even if a manual switch is tampered and actuated many times by a third party.

According to the present invention, there is provided an engine starting system for regularly starting an engine mounted on a propelled object, including: power activating section; an engine control unit; equipment on the propelled object side; steering unlocking section; alarming section; a switch capable of being manually actuated; which are mounted on the propelled object; and portable equipment possessed by a driver of the propelled object; the equipment on the propelled object side transmitting an inquiry signal including a collation code in response to an actuation signal of the switch, the portable equipment transmitting an answer signal including a cipher code corresponding to the inquiry signal to the equipment on the propelled object side, the equipment on the propelled object side unlocking the steering unlocking section while causing the engine control unit to operate by activating the power activating section in a case where the answer signal corresponds to the inquiry signal, thereby allowing the engine to start, in which the equipment on the propelled object side includes actuation signal refusing section which avoids responding to the actuation signal from the switch for a third predetermined time in at least one of the states where a number of actuation signals successively transmitted from the switch without producing an answer signal thereto has become equal to or larger than a prescribed number of times predetermined in a first predetermined time period and where the actuation signal has been kept tuned ON for a period equal to or longer than a second predetermined time period without producing an answer signal thereto.

According to the present invention, it is possible to prevent the abnormal consumption of a battery and overheating of a transceiver even if the switch which is operated for starting the engine is unnecessarily operated due to tampering or the like, without specifically providing additional hardware.

DESCRIPTION OF THE PREFERRED EMBODIMENT

Embodiment 1

Figure 1:
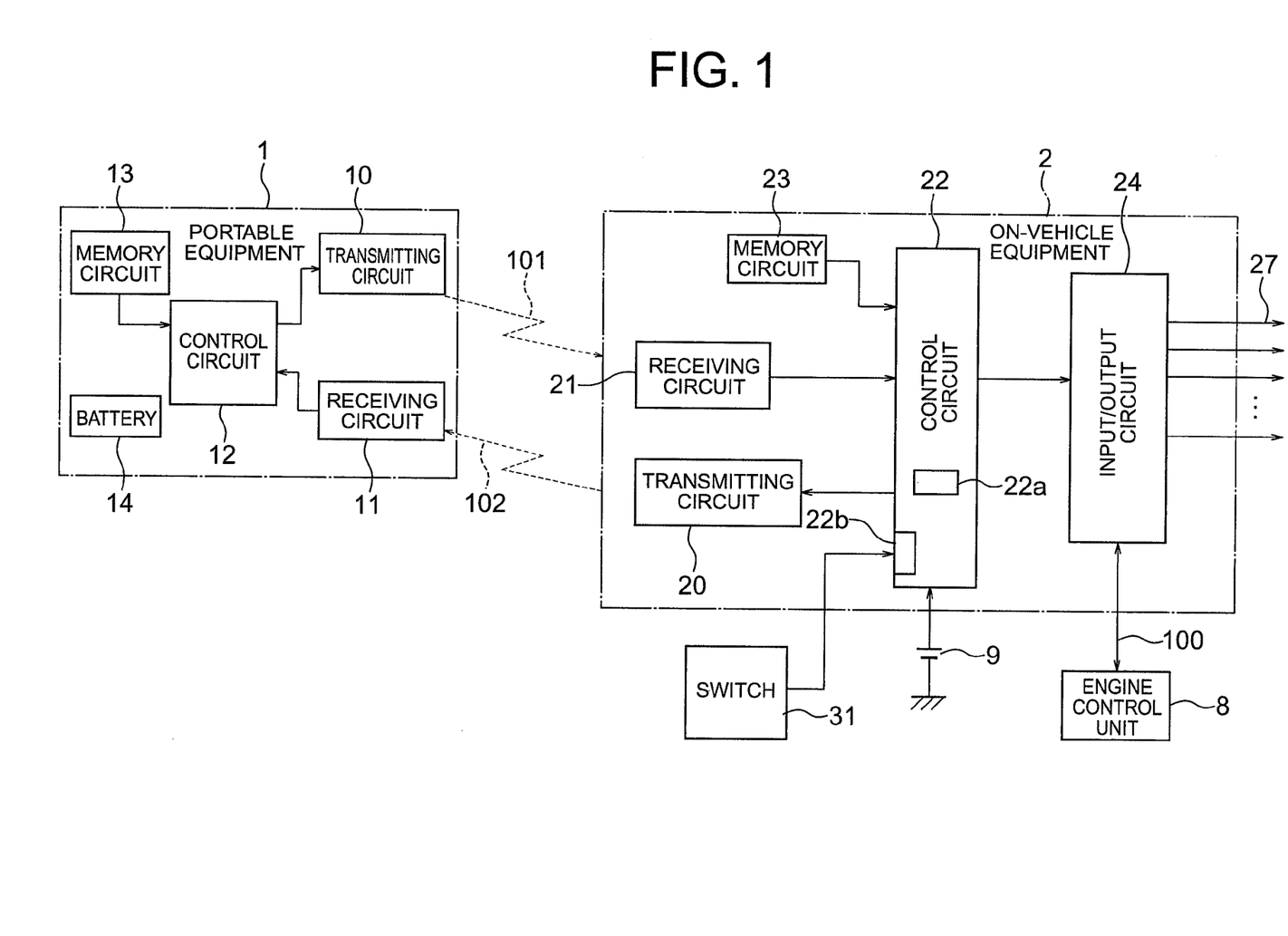
FIG. 1 is a block diagram schematically showing an engine starting system according to an embodiment of the present invention.

FIG. 1 is a block diagram schematically showing the overall structure of an engine starting system for a vehicle or the like which is a propelled object according to Embodiment 1 of the present invention. Illustrated in FIG. 1 is an example in which the present invention is applied to a two-wheeled vehicle. In FIG. 1, the engine starting system includes portable equipment 1 and on-vehicle equipment 2 constituting equipment on the propelled object side.

The portable equipment 1, which is possessed by an authorized driver (user), includes a transmitting circuit 10, a receiving circuit 11, a control circuit 12, a memory circuit 13 in which a cipher code is stored, and a battery 14 serving as a power source. The control circuit 12 operates by being supplied with power from the battery 14, reads the cipher code from the memory circuit 13, and carries out radio communication with the on-vehicle equipment 2 via the transmitting circuit 10 and the receiving circuit 11.

On the other hand, the on-vehicle equipment 2 installed in the vehicle includes a transmitting circuit 20, a receiving circuit 21, a control circuit 22, a memory circuit 23 in which a cipher code for collation (herein after, referred to as "the collation code") is stored, and an input/output circuit 24. The control circuit 22 operates by being supplied with power from an on-vehicle battery 9, reads the collation code from the memory circuit 23, and carries out radio communication with the portable equipment 1 via the transmitting circuit 20 and the receiving circuit 21.

The portable equipment 1 and the on-vehicle equipment 2 exchange radio communication signals 101 and 102 with each other via the transmitting circuit 10 and the receiving circuit 11, and via the transmitting circuit 20 and the receiving circuit 21.

A switch 31 constructed of an external actuating button on the vehicle side is connected to the control circuit 22 in the on-vehicle equipment 2. In response to an actuation signal of the switch 31, the control circuit 22 performs calculation based on a driving state and a collation result to obtain a control signal 27, and outputs the control signal 27 to an external relay or the like (which will be described later) via the input/output circuit 24. Further, the control circuit 22 is connected to an engine control unit 8 via the input/output circuit 24 and a communication line 100.

Figure 2:
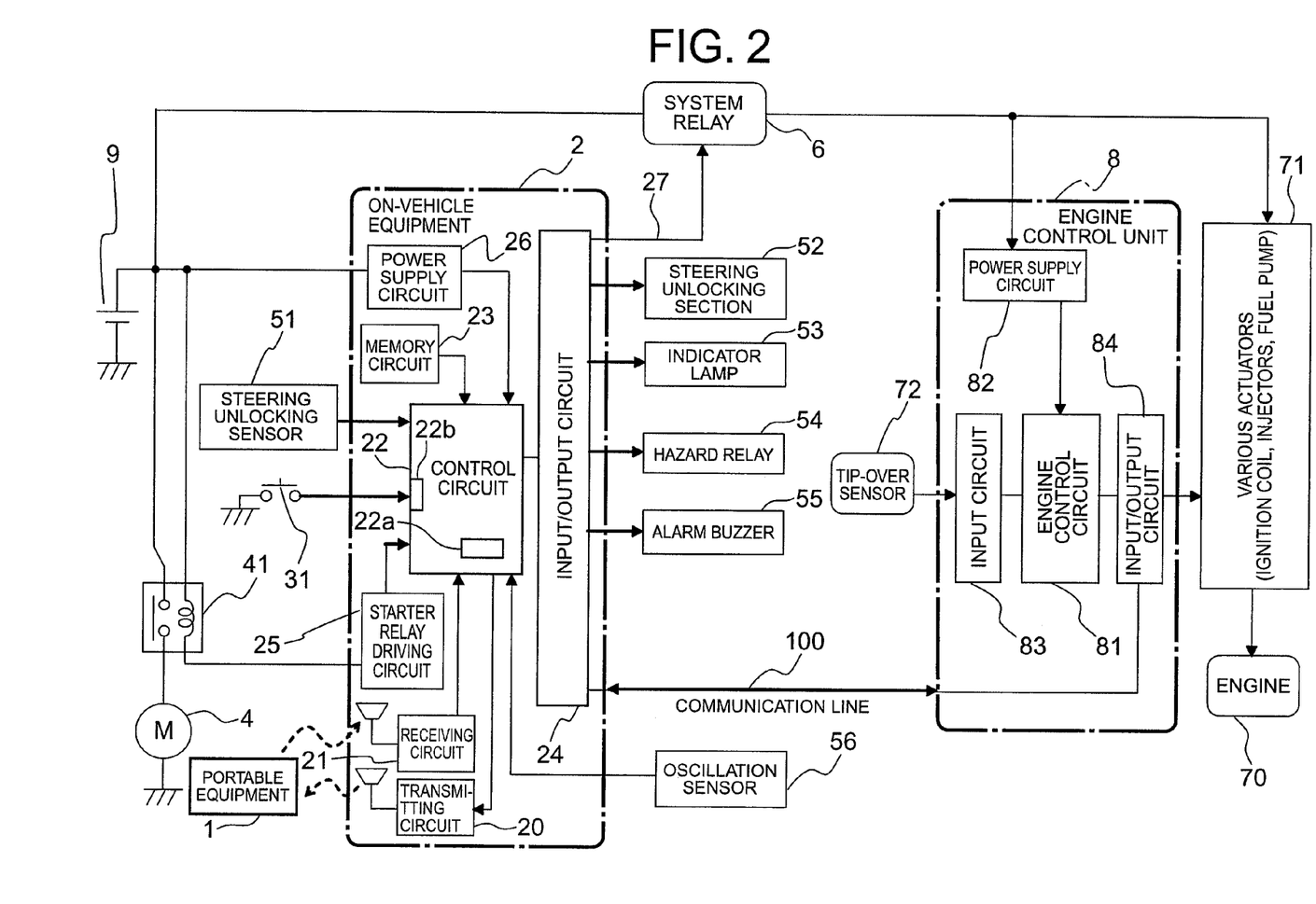
FIG. 2 is a block diagram concretely showing the on-vehicle equipment of FIG. 1 and peripheral equipment thereof.

FIG. 2 is a block diagram which concretely shows the structure of the on-vehicle equipment 2 of FIG. 1 in relation to the engine control unit 8 and peripheral equipment. Referring to FIG. 2, connected to the on-vehicle equipment 2 are a system relay 6, a starter relay 41 for energizing a starter (motor) 4 from the on-vehicle battery 9, a steering unlocking sensor 51, a steering unlocking section 52, an indicator lamp 53 for indicating various kinds of information, a hazard relay 54 for triggering an alarm, an alarm buzzer 55, and an oscillation sensor 56 for detecting theft, as well as the aforementioned components such as the engine control unit 8, the on-vehicle battery 9, and the switch 31.

A sensor group and a relay group including the system relay 6, the starter relay 41, and the like constitute the peripheral equipment of the on-vehicle equipment 2. The on-vehicle equipment 2 includes, in addition to the respective circuits 20 to 24 mentioned above, a starter relay driving circuit 25 for driving the starter relay 41 and a power supply circuit 26 connected to the on-vehicle battery 9 to supply power to the control circuit 22.

The starter relay driving circuit 25, the steering unlocking sensor 51, and the oscillation sensor 56 are connected to the control circuit 22 in the on-vehicle equipment 2. Further, the control signal 27 from the input/output circuit 24 is input to the system relay 6, the steering unlocking section 52, the indicator lamp 53, the hazard relay 54, and the alarm buzzer 55.

The engine control unit 8, which includes an engine control circuit 81, a power supply circuit 82 connected to the engine control circuit 81, an input circuit 83, and an input/output circuit 84, drivingly controls an engine 70 via each of the various actuators (an ignition coil, injectors, a fuel pump, and the like) 71. In the engine control unit 8, the power supply circuit 82 is connected to the on-vehicle battery 9 via the system relay 6 and supplies power to the engine control circuit 81.

A tip-over sensor 72 is connected to the input circuit 83, and the various actuators 71 are connected to the input/output circuit 84. The engine control unit 8 and the various actuators 71 are supplied with power from the on-vehicle battery 9 via the system relay 6. The input/output circuit 84 in the engine control unit 8 is connected to the input/output circuit 24 in the on-vehicle equipment 2 via the communication line 100 permitting bidirectional communication.

Figure 3:
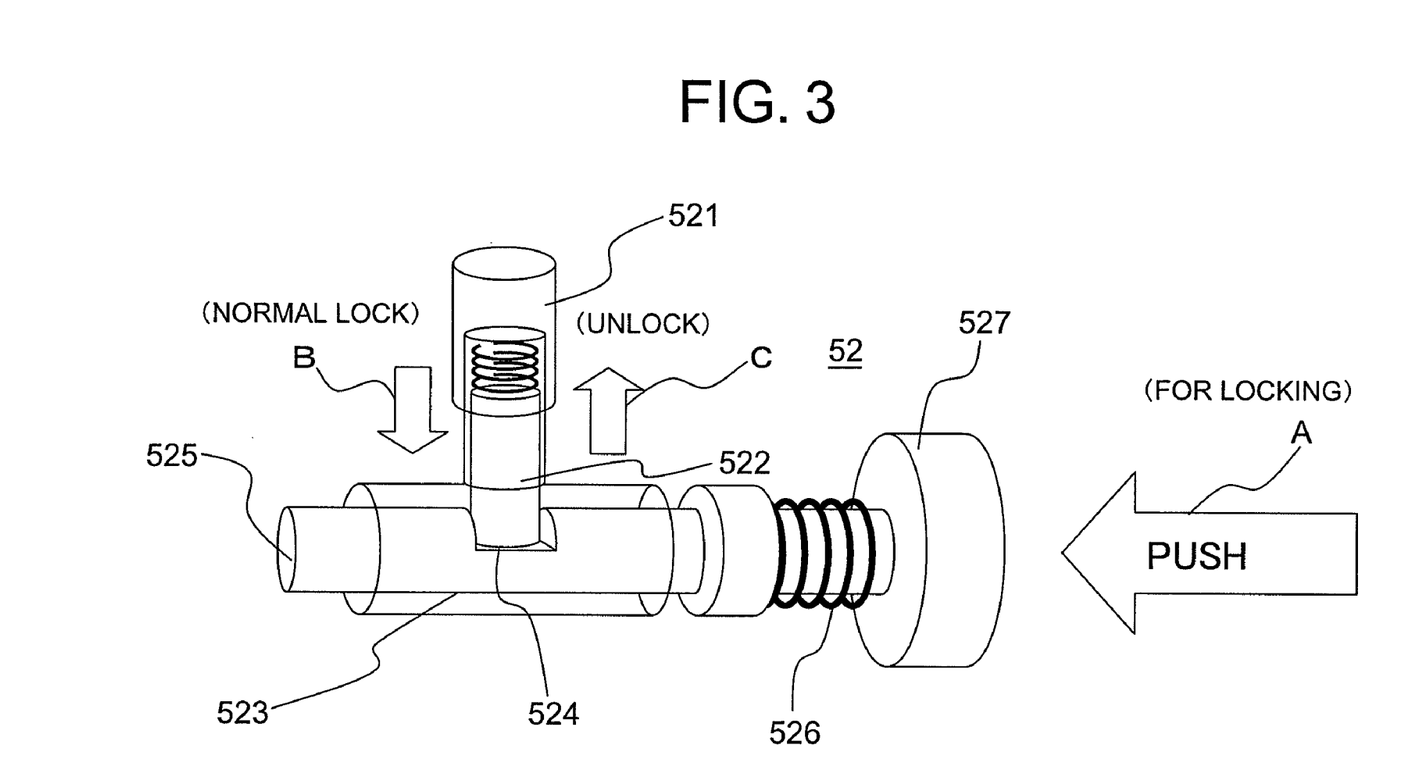
FIG. 3 is a perspective view showing a concrete structural example of steering unlocking section according to the present invention.

FIG. 3 is a perspective view showing a concrete structural example of the steering unlocking section 52 in FIG. 2, which is designed for use in a two-wheeled vehicle. Referring to FIG. 3, the steering unlocking section 52 includes an electromagnetic solenoid 521 energized at the time of an unlocking operation, a stopper 522 serving as an operating portion of the electromagnetic solenoid 521, a lock bar 523 engaging the stopper 522, a catch portion (recess) 524 formed in a central upper face of the lock bar 523, an operating end portion 525 of the lock bar 523, a spring 526 urging the lock bar 523 in an unlocking direction (to the right in FIG. 3), and a lock button 527 serving as an actuating portion of the lock bar 523.

When a steering (handle) is locked, the stopper 522 of the electromagnetic solenoid 521 is caught in the catch portion 524 of the lock bar 523, and the operating end portion 525 of the lock bar 523 is caught in a rotational member (not shown) of the steering, to thereby lock the steering so as not to rotate.

In the engine starting system shown in FIGS. 1 and 2, the on-vehicle equipment 2 transmits an inquiry signal (trigger signal) 102 from the transmitting circuit 20 in response to an actuation signal of the switch 31. The portable equipment 1 possessed by the driver then receives the inquiry signal 102 from the on-vehicle equipment 2, and returns an answer signal 101 for the inquiry signal 102 to the on-vehicle equipment 2.

As a result, the control circuit 22 in the on-vehicle equipment 2 thereby determines whether or not the answer signal 101 received from the portable equipment 1 corresponds to the inquiry signal 102. If it is determined that the answer signal 101 is authentic, the control circuit 22 generates and outputs the control signal 27 for unlocking from the input/output circuit 24, drives the steering unlocking section 52, unlocks the steering of the vehicle, and permits the engine 70 to be started.

At this moment, only by repeatedly actuating (pushing) the single switch (button) 31 attached to the vehicle, the steering unlocking section 52 is driven, the system relay 6 is turned ON, power supply circuits (vehicular power sources) 26 and 82 supplied with power from the on-vehicle battery 9 are activated (the power source for the system is turned ON), and a cranking section is driven (the engine 70 is started).

A short-time repetitive actuation (ON/OFF) or a long-time continuous actuation (continuous ON) can be selected as an actuation mode of the switch 31. For example, if a sequential shift of control is made through the short-time repetitive actuation of the switch 31, a determination on authenticity is made by the inquiry signal 102 and the answer signal 101 every time the switch 31 is actuated. Further, if a continuous shift of control is made through the long-time continuous actuation of the switch 31, a determination on authenticity is made by the inquiry signal 102 and the answer signal 101 at the first time only. Still further, the control of turning the power source of the system OFF (stopping the engine 70) via the system relay 6 can also be performed by actuating the switch 31.

Also, the system relay 6 constitutes power activating section, the on-vehicle equipment 2 constitutes the equipment on the propelled object side, the indicator lamp 53, the hazard relay 54, the alarm buzzer 55, and the oscillation sensor 56 constitute alarming section, the transmission circuit 10 and the receiving circuit 11 constitute a transceiver on the portable equipment side, and the transmission circuit 20 and the receiving circuit 21 constitute a transceiver on the propelled object side.

Next, specific operations of the respective circuits shown in FIGS. 1 and 2 will be described. First of all, if the driver (user) possessing the authenticated portable equipment 1 enters the vehicle and actuates the switch 31, the control circuit 22 in the on-vehicle equipment 2 reads the collation code from the memory circuit 23, and transmits by radio a trigger signal for cipher collation as the inquiry signal 102 via the transmitting circuit 20.

At this moment, if the driver (user) possessing the portable equipment 1 exists within a transmission range of the on-vehicle equipment 2, the receiving circuit 11 in the portable equipment 1 receives the inquiry signal (trigger signal) 102. Even if someone who does not possess the portable equipment 1 has actuated the switch 31, communication, collation, or the like of signals does not occur.

The control circuit 12 in the portable equipment 1 then refers to the collation code included in the inquiry signal 102 and determines whether to transmit a cipher code or not. The determination processing performed herein can be replaced with a processing of determining whether or not a so-called ID code has been received. In other words, the control circuit 12 can respond only to the collation code transmitted from the driver's own vehicle by determining from which vehicle the collation code received from the on-vehicle equipment 2 has been transmitted.

If it is determined that the received collation code has been transmitted from the driver's own vehicle, the control circuit 12 invokes the cipher code from the memory circuit 13 and transmits the cipher code by radio as the answer signal 101 via the transmitting circuit 10.

The battery 14 in the portable equipment 1 is a power supply source for operating the respective circuit portions. Until the subsequent inquiry signal 102 is received after the answer signal 101 has been transmitted, the battery 14 waits to receive the inquiry signal 102 in a low-consumption mode to prevent power consumption in the power supply source. In order to make power supply possible by activating the battery 14 upon receiving the inquiry signal 102, the battery 14 is designed as an energy-efficient battery capable of restraining power consumption.

The on-vehicle equipment 2 receives the answer signal 101 (including the cipher code) from the portable equipment 1 via the receiving circuit 21. The control circuit 22 in the on-vehicle equipment 2 invokes the collation code stored in the memory circuit 23 and collates the collation code with the received cipher code.

If, for example, the steering wheel has been locked when it is determined as a result of collation that the collation code coincides with the cipher code, the control circuit 22 outputs the control signal 27 for "unlocking" from the input/output circuit 24.

If the user actuates the switch 31 again at this moment, the collation of ID codes is carried out as described above. If it is determined as a result that the ID codes (the cipher code and the collation code) coincide with each other, the control circuit 22 in the on-vehicle equipment 2 generates and outputs the control signal 27 from the input/output circuit 24, turns the system relay 6 ON, and activates the engine control unit 8.

The control circuit 22 outputs an engine start permitting signal to the engine control unit 8 via the communication line 100. If the cipher code and the collation code do not coincide with each other, the control signal 27 is not generated from the on-vehicle equipment 2 and the system relay 6 is not turned ON.

Further, as described above, the steering unlocking sensor 51 for detecting the unlocking of the steering and the oscillation sensor 56 sensing the occurrence of theft by detecting oscillation of the vehicle when the engine is not allowed to operate are connected to the control circuit 22. Still further, connected to the input/output circuit 24 are the steering unlocking section 52 for unlocking the steering, the indicator lamp 53 indicating various kinds of information (e.g., an abnormality in the steering unlocking section 52, an abnormality in activation of the engine control unit 8, a warning in the event of theft), the hazard relay 54 issuing the same kinds of warnings (e.g., using a flasher lamp to provide an answer-back indication in response to the coincidence between collation results or driving the flasher lamp to emit flashes of light as a warning in the event of theft), and the alarm buzzer 55 issuing warning sound in the event of theft.

Furthermore, the engine control circuit 81 in the engine control unit 8 (the section for controlling the operation of the engine 70) outputs a drive signal corresponding to an operation state of the engine 70 via the input/output circuit 84, actuates the various actuators 71, and prohibits the operation of the engine 70. In addition to the tip-over sensor 72 for detecting tip-over of the vehicle, various sensors (not shown)

for detecting driving states (intake air temperature, engine coolant temperature, intake air amount, and the like) necessary to control the engine are connected to the engine control circuit 81.

An unlocking operation performed by the steering unlocking section 52 in response to the coincidence between cipher collation results will now be described. Referring to FIG. 3, if power is supplied to the electromagnetic solenoid 521 to release the stopper 522 caught in the catch portion 524 of the lock bar 523 in the direction indicated by an arrow C, the lock bar 523 moves toward the lock button 527 (to the right in FIG. 3) due to a restoring force of the spring 526. Then, the operating end portion 525 is released from the catch portion of the rotational member (not shown) of the steering, whereby the unlocking operation is completed. It is to be noted herein that the steering is locked manually by pushing the lock button 527.

Figure 4:
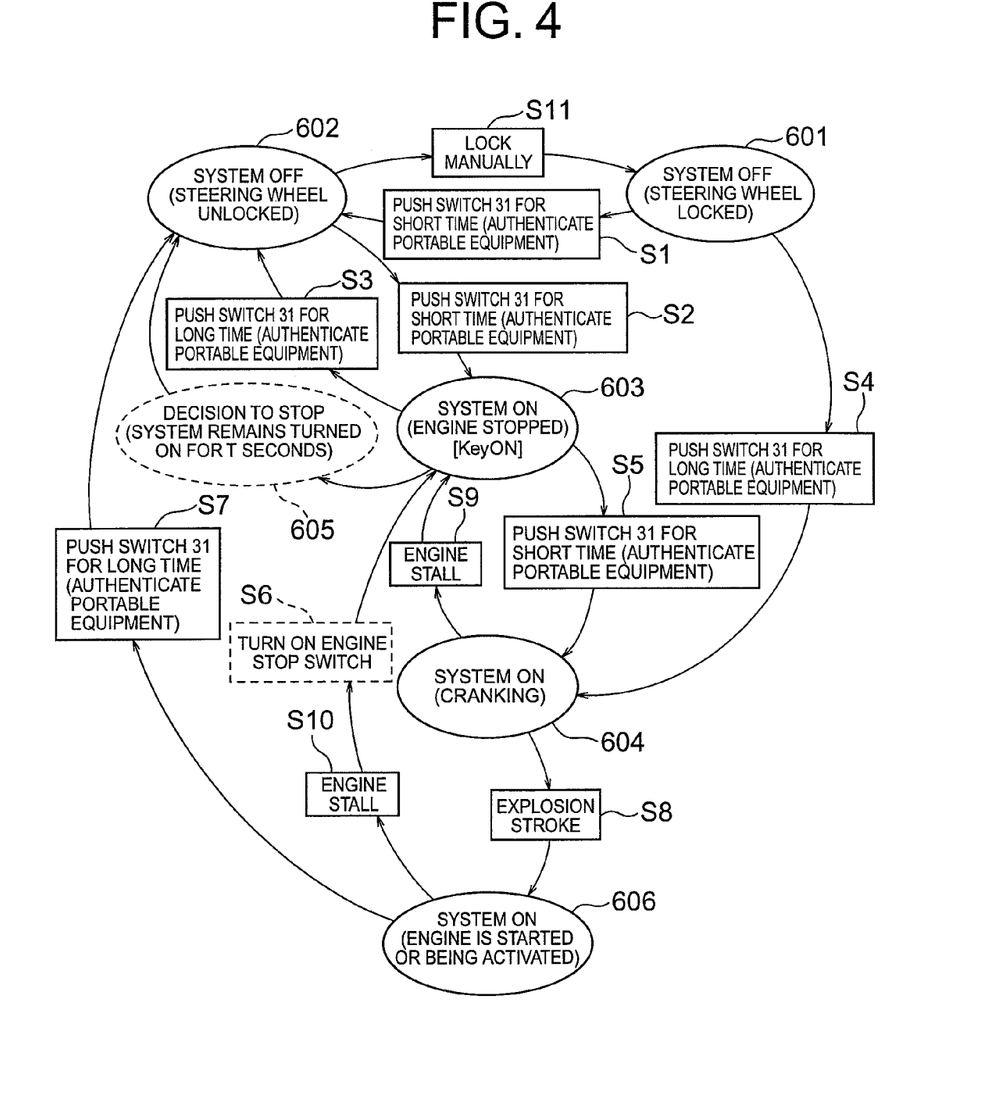
FIG. 4 is an explanatory diagram showing state transitions during operation of the system according to an embodiment of the present invention.

Referring to FIG. 4 as well as FIGS. 1 to 3, it will now be described how the driver unlocks the steering wheel and activates the engine 70. FIG. 4 is an explanatory diagram showing state transitions during operation of the system according to the first embodiment of the present invention. A flowchart in this drawing shows how the specialized system operation in the two-wheeled vehicle shifts from a steering unlocking mode to the permission of the operation of the engine 70 through an engine starting mode.

Referring to FIG. 4, first of all, the system is OFF in its initial state (when the steering wheel is locked) (step 601).

At this time, if the switch 31 is pushed for a short time, the control circuit 22 in the on-vehicle equipment 2 responds thereto and compares the cipher code received from the portable equipment 1 with the collation code to authenticate the portable equipment 1 (step S1).

If it is determined in step S1 that the cipher code coincides with the collation code, the steering wheel is unlocked with the system being OFF (step 602).

On the other hand, if it is determined that the cipher code does not coincide with the collation code, the current mode, that is, the OFF state of the system (step 601) is maintained.

In addition, if the switch 31 is pushed for a short time with the steering wheel being unlocked (step 602), the control circuit 22 in the on-vehicle equipment 2 compares again the cipher code received from the portable equipment 1 with the collation code and authenticates the portable equipment 1 (step S2).

If it is determined in step S2 that the cipher code coincides with the collation code, the control circuit 22 activates the system relay 6.

In the manner as described above, the system is turned ON (while the engine 70 is still stopped) (step 603).

At this moment, the engine control unit 8 starts up, and at the same time, the control circuit 22 delivers an engine start permitting signal to the engine control unit 8 via the communication line 100 and thus permits the various actuators 71 to be started.

Further, if it is desired to return the system from ON (step 603) to OFF, the switch 31 is pushed for a long time (the portable equipment 1 is authenticated) (step S3).

In response to this, the control circuit 22 stops driving the system relay 6, and as a result, the system is turned OFF again (step 602).

Further, if the system is left to remain ON (step 603), the on-vehicle equipment 2 stops driving the system relay 6 after the lapse of a predetermined period of time T [seconds] (e.g., 600 seconds: fourth predetermined period of time) (step 605) and shifts the system to the OFF mode (step 602).

On the other hand, if the switch 31 is pushed again for a short time (step S5) with the system being ON (step 603), the control circuit 22 turns the starter relay 41 ON via the starter relay driving circuit 25.

As a result, the starter 4 is driven over a predetermined period of time Ts [seconds] (e.g., 3 seconds: fifth predetermined period of time). Thus, the engine 70 can be cranked with the system being ON (step 604).

If the engine 70 has gone through an explosion stroke immediately after the lapse of the predetermined period of time Ts (3 seconds) or within the predetermined period of time Ts (step S8), the engine 70 is started or activated with the system being ON (step 606).

At this moment, if it is desired to stop only rotation of the engine 70, stoppage of the engine can be realized by turning a kill switch, that is, an engine stop SW (not shown) ON (step S6).

On the other hand, in the case where engine stall has occurred (step S9) with the system being ON (step 604) or in the case where the engine is stopped again (step S10) with the engine 70 being started or activated (system ON) (step 606), the system returns to the state where the system is turned ON while the engine is still stopped (step 603).

If it is desired to stop the engine 70 while the engine 70 is rotating (S606) after cranking (step 604), the system can be switched OFF (step 602) by pushing the switch 31 for a long time (step S7).

If it is desired to make a shift from the OFF state of the system with the unlocked steering wheel (step 602) to the OFF state of the system with the locked steering wheel (step 601), it is sufficient just to push the lock button 527 manually (see FIG. 3) (step S11).

Further, if it is desired to make a shift from the OFF state of the system with the locked steering wheel (step 601) to the ON state of the system with the cranking engine (step 604) by starting the engine at once, the switch 31 is pushed for a long time (the portable equipment 1 is authenticated) (step S4).

In response to this, the control circuit 22 turns the steering unlocking section 52 and the system relay 6 ON and issues a cranking command to the engine control unit 8 almost simultaneously. As a result, a direct shift from the OFF state of the system (step 601) to the cranking state (step 604) can be made.

At this moment, since the control circuit 22 performs, in step S4, the processing of comparing the cipher code of the portable equipment 1 with the collation code only once, the time required for a shift to the starting mode can be reduced.

Next, referring to timing charts shown in FIGS. 5 and 6, it will be described more specifically how the control circuit 22 in the on-vehicle equipment 2 operates depending on how long the switch 31 is actuated (i.e., whether the switch 31 is pushed for a short time or for a long time).

Figure 5:
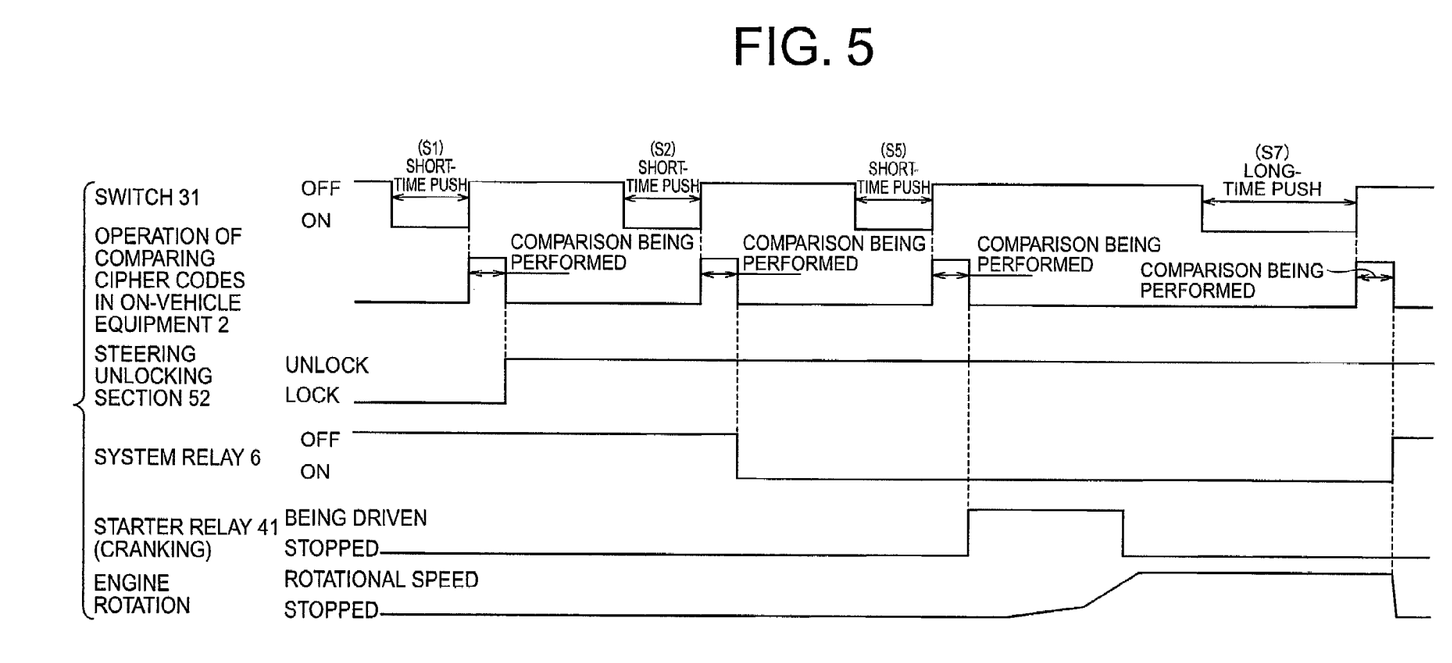
FIG. 5 is a timing chart showing an operation performed when a switch is actuated through a short-time push in the engine starting system according to an embodiment of the present invention.
Figure 6:
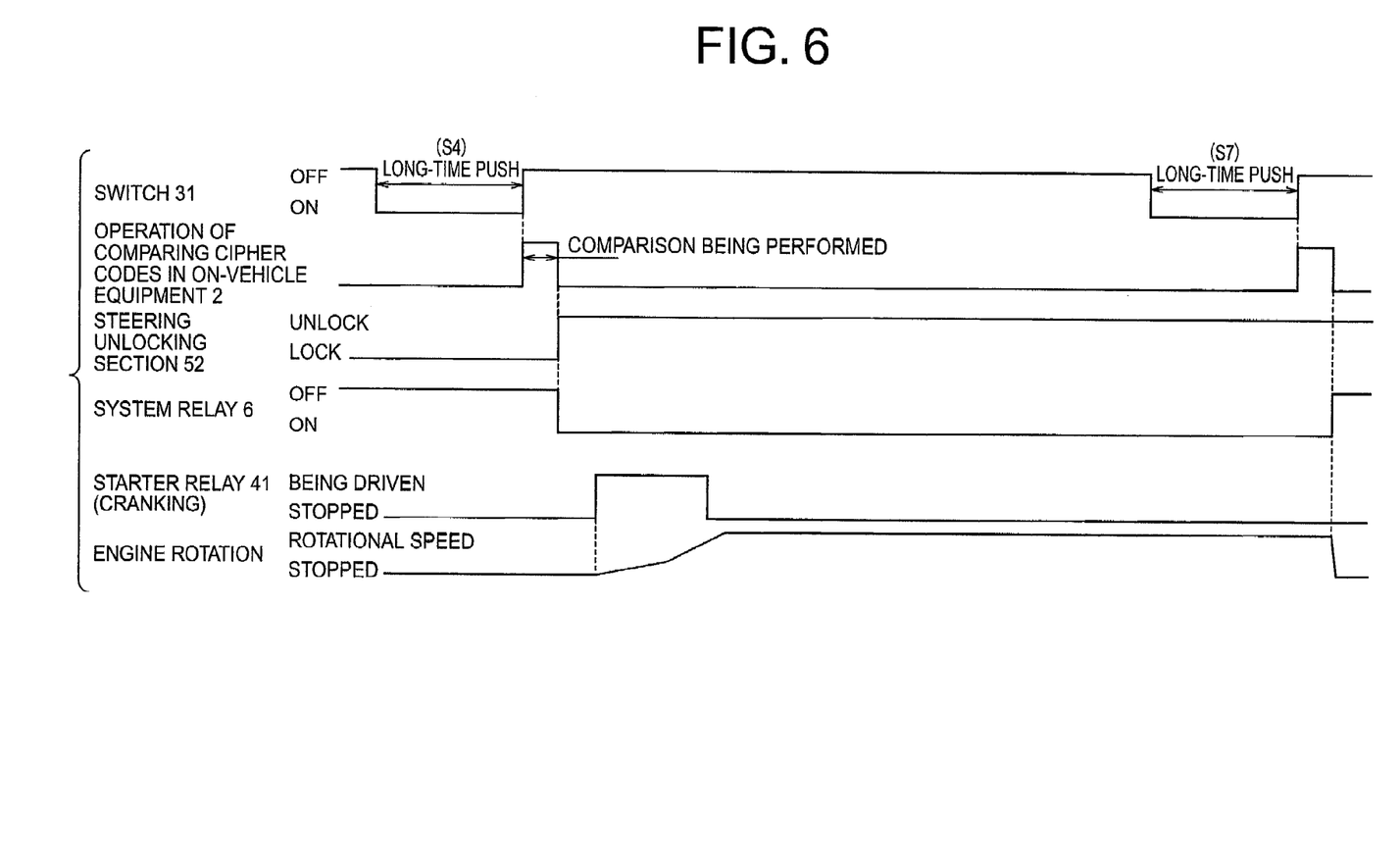
FIG. 6 is a timing chart showing an operation performed when a switch is actuated through a long-time push in the engine starting system according to an embodiment of the present invention.

FIG. 5 shows how the control circuit 22 operates when the switch 31 is sequentially actuated through a short-time push, and FIG. 6 shows how the control circuit 22 operates when the switch 31 is actuated through a long-time push.

In FIGS. 5 and 6, the actuation of the switch 31 by the driver (user), the operation of comparing cipher codes in the on-vehicle equipment 2, the unlocking operation of the steering unlocking section 52 by the control circuit 22, and the operation of activating and stopping the system relay 6 by the control circuit 22 are illustrated together with changes in the rotational speed of the engine 70.

Further, timings for actuating the switch 31 are shown in relation to the respective steps S1, S2, S4, S5, and S7 in FIG. 4.

First, as shown in FIG. 5, if the switch 31 is repeatedly and sequentially actuated for a short time (steps S1, S2, and S5) with the system being OFF and the steering being locked, the control circuit 22 in the on-vehicle equipment 2 performs the processing of comparing cipher codes every time after the switch 31 has been actuated through a short-time push. If it is determined that the cipher codes coincide with each other, the control circuit 22 performs a processing corresponding to the timing of actuation.

That is, in response to the first short-time push (step S1), the cipher codes are compared with each other and then unlocking operation of the steering unlocking section 52 is performed. In response to the subsequent short-time push (step S2), the cipher codes are compared with each other and then the system relay 6 is turned ON (activated).

Further, in response to the final short-time push (step S5), the cipher codes are compared with each other and then cranking (starting of the engine 70) is performed.

In addition, if the switch 31 is actuated through a long-time push (step S7) after activation of the system relay 6, the control circuit 22 compares the cipher codes with each other in response and then turns the system relay 6 OFF.

On the other hand, as shown in FIG. 6, if the switch 31 is actuated through a long-time push (step S4) with the system being OFF and the steering being locked, the control circuit 22 compares the cipher codes with each other and then activates the system relay 6, performs the unlocking operation of the steering unlocking section 52, and carries out cranking (starting of the engine 70) almost simultaneously.

In this case, since the processing of comparing cipher codes with each other in the on-vehicle equipment 2 is performed only once through a long-time push (step S4), the time required for a shift to the starting mode can be reduced.

Hereinbelow, a description will be given of countermeasures against tampering. When the switch 31 in FIG. 1, FIG. 2, and FIG. 4 is successively actuated by a malicious third party even if the third party does not possess the portable equipment 1, the on-vehicle equipment 2 transmits radio waves to communicate with the portable equipment 1, without performing any specific control, every time the switch 31 is actuated. At this time, the control circuit 22 of the on-vehicle equipment 2 includes actuation signal refusing section 22a (refer to FIGS. 1 and 2) described below, which is used for preventing tampering.

Figure 7:
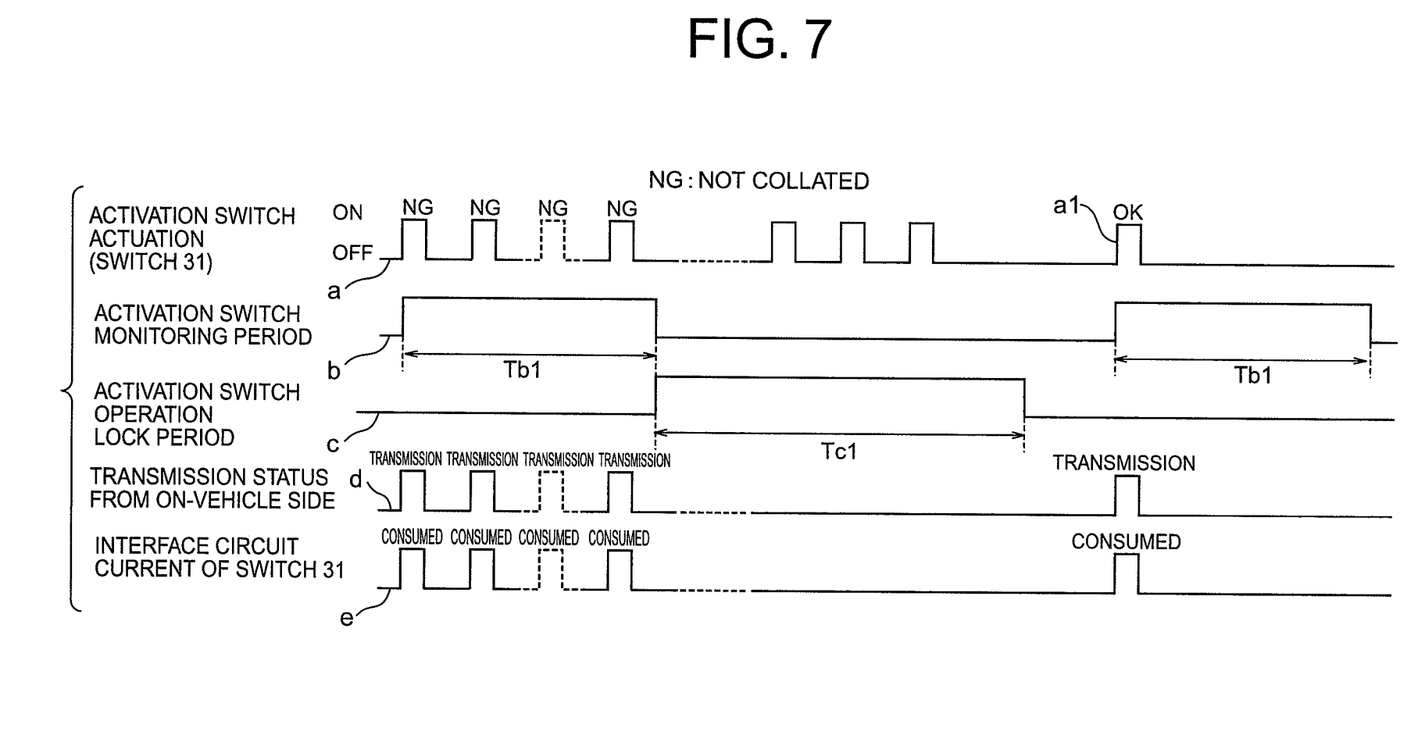
FIG. 7 is a timing chart for explaining control to be exerted in accordance with a switching operation in the engine starting system according to an embodiment of the present invention.

FIG. 7 is a time chart for explaining the actuation signal refusing section 22a, in which the lines denoted by reference symbols a, b, c, d, and e each show actuation of an activation switch, an activation switch monitoring period, how radio waves are transmitted from the on-vehicle equipment side, and an interface circuit current of the switch 31, respectively. The line denoted by reference symbol a indicates an actuation signal of the switch 31, in particular, an input signal from the switch 31, which is on the ON side when the switch 31 is pushed. When the switch 31 is pushed, radio waves are transmitted from the on-vehicle equipment 2 side as indicated by the line denoted by reference symbol d, and the interface circuit 22b (refer to FIGS. 1 and 2) in the control circuit 22 for the switch 31 consumes a current. FIG. 7 shows a case where the switch 31 is successively (repeatedly) pushed as indicated by the line denoted by reference symbol a.

During the activation switch monitoring period Tb1, the actuation signal refusing section 22a of the control circuit 22 counts the number of actuation signals, of the actuation signals transmitted from the switch 31, for each of which no answer signal is obtained from the portable equipment 1 with respect to the inquiry signal transmitted to the portable equipment 1 within a predetermined time period. In other words, the actuation signal refusing section 22a counts the number of the actuation signals a from the switch 31. Then, in a case where the number of the actuation signals a for each of which no answer signal is obtained is equal to or more than a prescribed number of times (for example, 10 times) preset within the monitoring period Tb1 (for example, 5 to 10 seconds: a first predetermined period), it is determined that the switch 31 is being tampered, and no answer is given to an actuation signal a from the switch 31 for an activation switch actuation lock period Tc1 (for example, 10 seconds to 1 minute: a third predetermined period), to thereby prevent radio waves from being transmitted to the portable equipment 1. After that, as indicated by reference symbol al, when an authorized user comes to possess the portable equipment 1 and the switch 31 is actuated by the user, an answer signal is received in response to an inquiry signal transmitted, and normal communication is established with respect to the portable equipment 1 and collation is performed on signals.

Figure 8:
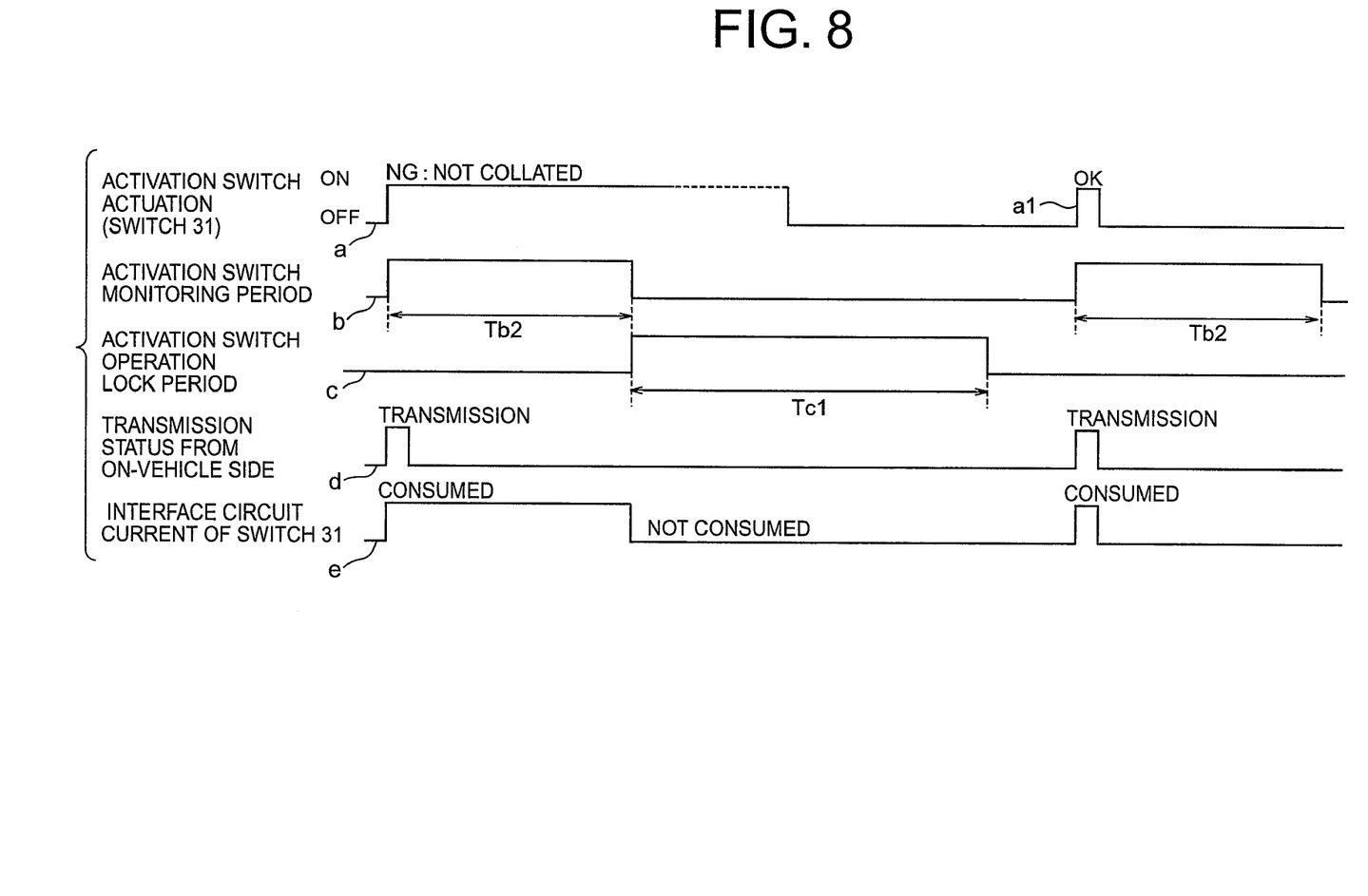
FIG. 8 is a timing chart for explaining control to be exerted in accordance with a switching operation in the engine starting system according to an embodiment of the present invention.

FIG. 8 is also a time chart for explaining the countermeasures against tampering, in which reference symbols a to e denote constituent elements similar to those of FIG. 7. As indicated by the line denoted by reference symbol a of FIG. 8, even in a case where the switch 31 is continuously pushed, the interface circuit 22b on the on-vehicle equipment side 2 consumes a current as indicated by the line denoted by reference symbol e. Accordingly, in the case where the switch 31 is continuously pushed generating an actuation signal a, the actuation signal refusing section 22a measures the duration of time during which no answer signal is obtained from the portable equipment 1 even if an inquiry signal is transmitted to the portable equipment 1 in response to the actuation signal a thus generated. In a case where the duration of time thus measured continues for the activation switch monitoring period Tb2 (for example, 10 seconds or more: a second predetermined time period) or more (in other words, the actuation signal is kept turned ON for the monitoring period Tb2 or more), no answer signal is given to the actuation signal a from the switch 31 during the activation switch actuation lock period Tc1 as described above, to thereby prevent radio waves from being output to the portable equipment 1.

It is also possible to combine the above-mentioned time charts, and in at least one of the cases where actuation signals a for each of which no answer signal are successively obtained prescribed times or more, the prescribed times being predetermined within the monitoring period Tb1, and where the actuation signal a for which no answer signal is obtained is kept turned ON for the monitoring period Tb2 or more, the actuation signal a from the switch 31 may not be responded during the activation switch actuation lock period Tc1. The monitoring period Tb1 and the monitoring period Tb2 may be set to have different lengths, or have the same length. The number of times of actuation of the switch 31 within the monitoring period Tb1 is equally counted regardless of whether the switch 31 is pushed for a short time or for a long time.

Also, in order not to respond to the actuation signal a from the switch 31, during the activation switch actuation lock period Tc1 the interface circuit 22b for the switch 31 in the control circuit 22 may be turned into a nonresponding state, that is, an OFF state in which no current flows therethrough. In this manner, power consumption in the interface circuit 22b can be reduced. The same applies to a modification embodiment described later.

Figure 9:
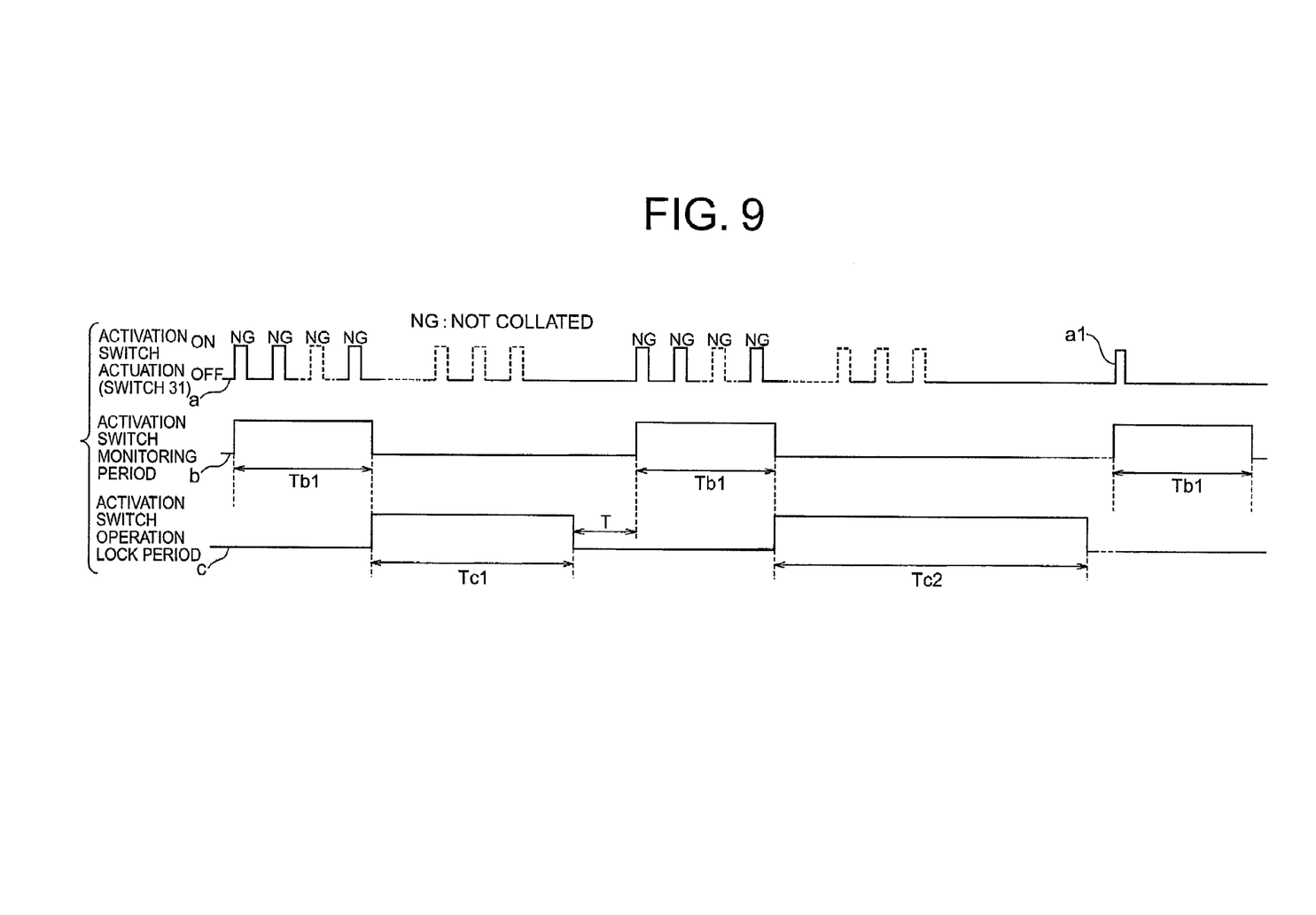
FIG. 9 is a timing chart for explaining control to be exerted in accordance with a switching operation in the engine starting system according to an embodiment of the present invention.

Further, by assuming a case where the above-mentioned successive actuation of the switch 31 shown in FIG. 7 is repeatedly performed, a plurality of activation switch monitoring periods Tb1 are provided as shown in FIG. 9. In a case where the number of actuation signals an equal to or more than a prescribed times is counted twice or more, it is determined that the switch 31 is still being tampered. In this case, an activation switch actuation lock period Tc2 (of, for example, 1 minute to 10 minutes) longer than the activation switch actuation lock period Tc1 which is originally set may be provided so as not to respond to the actuation signal a. The second activation switch monitoring period Tb1 is started on condition that the switch 31 is actuated within a time T after the expiration of the first activation switch actuation lock period Tc1 and an actuation signal a for which no answer signal is obtained is input. When the switch 31 is actuated after a lapse of the time T, the flow returns to the start of the first activation switch monitoring period Tb1. After that, as indicated by reference symbol al, when an authenticated user comes to possess the portable equipment 1 and the switch 31 is actuated, an answer signal is received in response to an inquiry signal transmitted, and normal communication is established with respect to the portable equipment 1 and collation is performed on signals.

Figure 10:
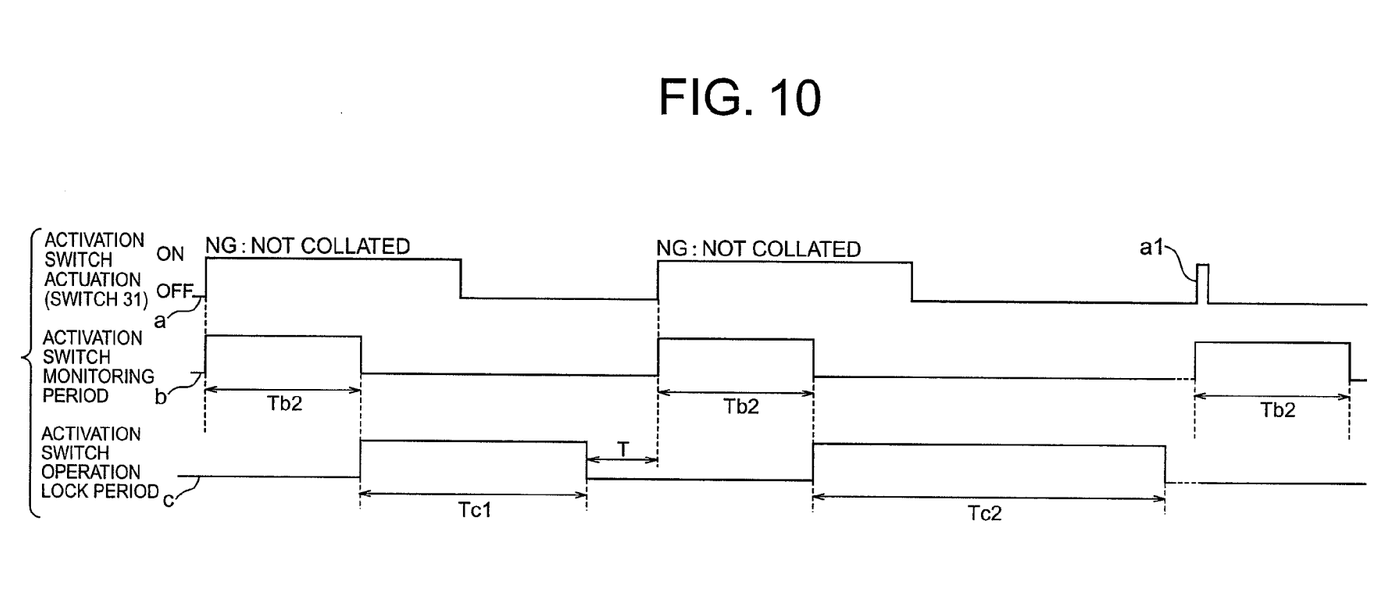
FIG. 10 is a timing chart for explaining control to be exerted in accordance with a switching operation in the engine starting system according to an embodiment of the present invention.

Alternatively, by assuming a case where the above-mentioned continuous actuation of the switch 31 shown in FIG. 8 is repeatedly performed, a plurality of activation switch monitoring periods Tb2 are provided as shown in FIG. 10. In a case where two or more of the actuation signals a which are kept turned on for the monitoring period Tb2 or more are counted, it is determined that the switch 31 is still being tampered. In this case, an activation switch actuation lock period Tc2 (of, for example, 1 minute to 10 minutes) longer than the activation switch actuation lock period Tc1 which is originally set may be provided so as not to respond to the actuation signal a. The second activation switch monitoring period Tb2 is started on condition that the switch 31 is actuated within a time T after the expiration of the first activation switch actuation lock period Tc1 and an actuation signal a for which no answer signal is obtained is input. When the switch 31 is actuated after a lapse of the time T, the flow returns to the start of the first activation switch monitoring period Tb2. After that, as indicated by reference symbol al, when an authenticated user comes to possess the portable equipment 1 and the switch 31 is actuated, an answer signal is received in response to an inquiry signal transmitted, and normal communication is established with respect to the portable equipment 1 and collation is performed on signals.

The functions described in FIG. 9 and FIG. 10 may be selectively provided in addition to the functions shown in FIG. 7 and FIG. 8 as necessary.

Also, in the above description, the activation switch actuation lock periods Tc1 and Tc2 are provided in twofold. The activation switch actuation lock periods, however, may also be provided in threefold or more, and the duration of each of the activation switch actuation lock periods may be increased stepwise along with the increase in the number of times of occurrence of the above-mentioned status.

Also, the above-mentioned function or construction is not limited to the above-mentioned system, and may also be applicable to a key system used for a glove compartment or a tank cap of a two-wheeled vehicle, which uses an electric key system which is unlocked through the above-mentioned switch actuation.

As described above, according to the present invention, it is possible to suppress wasteful consumption of a battery due to an unnecessary operation of an activation switch tampered by a third party and also to prevent the components from being degraded due to overheating of the control circuit.

In particular, in a case where the present invention is applied to a two-wheeled vehicle, for which a cost reduction is demanded, the present invention produces a significant effect of preventing, at low cost, a battery from being consumed due to tampering, without additionally providing hardware.

In the above, the description has been given of a case where the present invention is applied to a two-wheeled vehicle, but it is of course possible to apply the present invention to another arbitrary propelled object which is propelled by the engine 70 (for example, an automobile, an ATV, a ship, a jet-propulsion watercraft, or the like).

What is claimed is:

1. An engine starting system for regularly starting an engine mounted on a propelled object, comprising:
   power activating means; an engine control unit; equipment on the propelled object side; steering unlocking means; alarming means; a switch capable of being manually actuated; which are mounted on the propelled object; and
   portable equipment possessed by a driver of the propelled object;
   the equipment on the propelled object side transmitting an inquiry signal including a collation code in response to an actuation signal of the switch, the portable equipment transmitting an answer signal including a cipher code corresponding to the inquiry signal to the equipment on the propelled object side, the equipment on the propelled object side unlocking the steering unlocking means while causing the engine control unit to operate by activating the power activating means in a case where the answer signal corresponds to the inquiry signal, thereby allowing the engine to start,
   wherein the equipment on the propelled object side includes actuation signal refusing means which avoids responding to the actuation signal from the switch for a third predetermined time in at least one of the states where a number of actuation signals successively transmitted from the switch without producing an answer signal thereto has become equal to or larger than a prescribed number of times predetermined in a first predetermined time period and where the actuation signal has been kept tuned ON for a period equal to or longer than a second predetermined time period without producing an answer signal thereto.

2. The engine starting system according to claim 1, wherein the actuation signal refusing means increases the third predetermined time period in a case where there has successively occurred at least one of states where a number of actuation signals successively transmitted from the switch without producing an answer signal thereto has become equal to or larger than a prescribed number of times predetermined in the first predetermined time period and where the actuation signal has been kept tuned ON for a period equal to or longer than the second predetermined time period without producing an answer signal thereto, the third predetermined time being increased along with an increase in the number of the states.

3. The engine starting system according to claim 1, wherein the first predetermined time period in which the number of actuation signals successively transmitted without producing an answer signal thereto is different in length from the second predetermined time period in which the duration time during which the actuation signal is kept turned ON without producing an answer signal thereto.

4. The engine starting system according to claim 2, wherein the first predetermined time period in which the number of actuation signals successively transmitted without producing an answer signal thereto is different in length from the second predetermined time period in which the duration time during which the actuation signal is kept turned ON without producing an answer signal thereto.

5. The engine starting system according to claim 1, wherein the actuation signal refusing means avoid responding to an actuation signal by avoiding transmitting an inquiry signal to the portable equipment.

6. The engine starting system according to claim 2, wherein the actuation signal refusing means avoid responding to an actuation signal by avoiding transmitting an inquiry signal to the portable equipment.

7. The engine starting system according to claim 3, wherein the actuation signal refusing means avoid responding to an actuation signal by avoiding transmitting an inquiry signal to the portable equipment.

8. The engine starting system according to claim 4, wherein the actuation signal refusing means avoid responding to an actuation signal by avoiding transmitting an inquiry signal to the portable equipment.

9. The engine starting system according to claim 1, wherein:
   the equipment on the propelled object side includes an interface circuit for receiving an actuation signal of the switch; and,
   the actuation signal refusing means refuses an actuation signal by avoiding the interface circuit from responding to the actuation signal.

10. The engine starting system according to claim 2, wherein:
    the equipment on the propelled object side includes an interface circuit for receiving an actuation signal of the switch; and,
    the actuation signal refusing means refuses an actuation signal by avoiding the interface circuit from responding to the actuation signal.

11. The engine starting system according to claim 3, wherein:
    the equipment on the propelled object side includes an interface circuit for receiving an actuation signal of the switch; and,
    the actuation signal refusing means refuses an actuation signal by avoiding the interface circuit from responding to the actuation signal.

12. The engine starting system according to claim 4, wherein:
    the equipment on the propelled object side includes an interface circuit for receiving an actuation signal of the switch; and,
    the actuation signal refusing means refuses an actuation signal by avoiding the interface circuit from responding to the actuation signal.

13. The engine starting system according to claim 1, wherein the propelled object comprises a two-wheeled vehicle.

* * * * *